Patented July 7, 1942

2,288,804

UNITED STATES PATENT OFFICE 2,288,804

METHOD OF PRODUCING DETERGENTS

Torsten Hasselstrom, Savannah, Ga., assignor to G & A Laboratories, Inc., Savannah, Ga., a corporation of Georgia No Drawing. Application February 8, 1940, Serial No. 317,993

2 Claims. (Cl. 260—98)

This invention relates to an improved method of producing a detergent and wetting agent from pseudopimaric acid.

In my U. S. Patent 2,121,032, issued June 21, 1938, the method of preparation of a detergent and wetting agent by treatment of pseudopimaric acid with a sulfonating agent and the product so obtained are described and claimed. The product is described as a sulfonic acid.

Now, in accordance with this invention, an improved method of producing a sulfonic acid derivative from pseudopimaric acid is described. My new method provides many advantages in the preparation of the sulfonic acid over the methods broadly described and claimed in my above-identified patent. By my improved method of preparation the sulfonic acid derivative may be isolated in a higher state of purity and by a more simplified process. My improved process also is more readily adapted to commercial production.

In my above identified patent I refer for a description of pseudopimaric acid to an application for United States Letters Patent, Serial No. 675,976, filed June 15, 1933 and now issued as Patent No. 2,072,628. I also in my Patent No. 2,121,032 describe the pseudopimaric acid at considerable length. Further identification of pseudopimaric acid for the purposes of this invention is unnecessary.

The first step of my present invention comprises sulfonation by treatment with concentrated sulfuric acid of pseudopimaric acid or of mixtures containing pseudopimaric acid, such, for example, as result from suitable heat-treatment of wood and/or gum rosin. The sulfonation may be carried out, if desired, in a suitable solvent attacked or unattacked by concentrated sulfuric acid, e. g., carbon tetrachloride, liquid sulfur dioxide, petroleum distillates, saturated and/or unsaturated hydrocarbons, preferably of the aromatic and/or hydroaromatic series, although I may employ unsaturated aliphatic hydrocarbons, or mixtures thereof.

As sulfonating agent I preferably employ sulfuric acid of specific gravity about 1.84, although I may employ somewhat lower or somewhat higher strengths, even to fuming sulfuric acid, or chlorsulfonic acid or sulfur trioxide as the sulfonating agent.

The sulfonation mixture obtained is then treated with water at a temperature below about 100° C. As a result of this treatment, a brownish precipitate is separated. After washing to free residual sulfuric acid, the brownish precipitate is treated with a suitable calcium salt such as, for example, calcium carbonate, calcium bicarbonate, calcium chloride, etc. so as to form the calcium salt of the sulfonic acid of pseudopimaric acid contained in the brownish product. The calcium salt of the sulfonic acid may then be purified by any convenient means such as by extracting with an organic solvent, as for example, ethyl acetate, benzol, carbon tetrachloride, tetrachlorethane, etc. The salt may then be acidified so as to free the sulfonic acid of pseudopimaric acid in purified form.

The quality of the sulfonic acid obtained by following my improved procedure involving formation of the calcium salt of the sulfonic acid as a means of separation from the residual sulfonation materials is superior to that obtained by employing the hot water extraction procedure described in my prior patent.

As an example of the procedure for carrying out my invention, the following may be cited:

Example I

One hundred parts by weight of partially refined pseudopimaric acid, M. P. 69° C., $(\alpha)^{31}_D + 25.8°$, were mixed with 368 parts by weight of sulfuric acid of sp. gr. 1.84 at a temperature of 15 to 35° C. for about 30 minutes. The mixture was then poured onto 200 parts by weight of cracked ice. The temperature was not allowed to go above 20° C. Then 200 parts by weight of water were added. A brownish precipitate separated and was filtered off, washed with water until substantially free of residual sulfuric acid. About 10 parts by weight of calcium carbonate and 75 parts by weight of water were then added to the precipitate and the mixture was stirred until neutralization of the sulfonic acid contained in the original brownish precipitate was complete. The precipitate of the calcium salt of the sulfonic acid was then filtered off and extracted with a 2:1 mixture by volume of ethyl acetate and water to remove extraneous matter. The yield of calcium salt remaining was 78.6 parts by weight. From the solvent extract, 48 parts by weight of a neutral resin material were obtained by evaporation of the solvent. The purified calcium salt was then acidified with dilute sulfuric acid. A solution of 10 parts by weight of sodium carbonate in 600 parts by weight of water was then added to the sulfonic acid mixture and the solution filtered to remove calcium sulfate. By acidification of the filtrate with dilute sulfuric acid, the pseudopimaric acid sulfonate precipitated and was removed by filtration. The yield of dried and purified sulfonic acid of pseudopimaric acid was 48 parts by weight. The sulfonic acid had a M. P. of 223–224° C. (with decomposition).

It will be appreciated that the details and proportions set forth in the above are illustrative only, and that the invention as broadly described and claimed is in no way limited thereby.

The sulfonic acid product will be found variously adapted to uses as an improved detergent and wetting out agent, e. g., in the scouring of textiles, as a soap assistant, etc.

What I claim and desire to protect by Letters Patent is:

1. The method of preparation of a purified sulfonic acid which comprises treating pseudopimaric acid with a sulfonating agent under sulfonating conditions, treating the resulting sulfonated pseudopimaric acid reaction mixture with water at a temperature below about 100° C. to precipitate pseudopimaric sulfonic acid in crude form, washing out excess sulfonating agent from the precipitate, treating the crude pseudopimaric sulfonic acid with a calcium salt reactive therewith to form a calcium salt of the pseudopimaric sulfonic acid as a precipitate phase, extracting essentially neutral resin material from the calcium salt maintained in the insoluble state with an organic solvent for the neutral resin material, adding acid to the purified pseudopimaric sulfonic acid calcium salt to form free pseudopimaric sulfonic acid and a water-insoluble calcium salt, and separating the calcium salt from the pseudopimaric acid sulfonate by dissolving the latter in aqueous alkali.

2. The method of preparation of a purified sulfonic acid which comprises treating pseudopimaric acid with concentrated sulfuric acid under sulfonating conditions, treating the resulting sulfonated pseudopimaric acid reaction mixture with water at a temperature below about 100° C. to precipitate pseudopimaric sulfonic acid in crude form, washing out excess sulfuric acid from the precipitate, treating the crude pseudopimaric sulfonic acid with a calcium salt reactive therewith to form a calcium salt of the pseudopimaric sulfonic acid as a precipitate phase, extracting essentially neutral resin material from the calcium salt maintained in the insoluble state with an organic solvent for the neutral resin material, adding acid to the purified pseudopimaric sulfonic acid calcium salt to form the free pseudopimaric sulfonic acid and a water-insoluble calcium salt, and separating the calcium salt from the pseudopimaric acid sulfonate by dissolving the latter in aqueous alkali.

TORSTEN HASSELSTROM.